United States Patent
Dazy et al.

[11] Patent Number: 6,109,630
[45] Date of Patent: Aug. 29, 2000

[54] REAR SUSPENSION UPPER CONTROL ARM (A-ARM) WITH VERTICALLY MOUNTED SPOOL BUSHINGS

[75] Inventors: Michael A. Dazy, Northville; Scott A. Bone, Wixom, both of Mich.

[73] Assignee: DaimlerChrysler Corporation, Auburn Hills, Mich.

[21] Appl. No.: 09/186,981

[22] Filed: Nov. 5, 1998

[51] Int. Cl.$^7$ ................................................. B60G 3/00
[52] U.S. Cl. ........................ 280/124.11; 280/124.156; 280/94.511
[58] Field of Search ........................... 280/124.1, 124.11, 280/124.128, 124.153, 124.106, 124.109, 93.511, 124.156, 124.117

[56] References Cited

U.S. PATENT DOCUMENTS

| | | | |
|---|---|---|---|
| 3,157,242 | 11/1964 | Kozicki | 280/124.156 |
| 5,366,035 | 11/1994 | Hayashida et al. | 280/124.117 |

*Primary Examiner*—Kevin Hurley
*Assistant Examiner*—Lynda Jasmin
*Attorney, Agent, or Firm*—Marc Lorelli

[57] ABSTRACT

An upper control arm assembly for a rear axle of an uni-body vehicle. The uni-body vehicle includes a pair of longitudinally spaced opposing sills generally extending along the length of the vehicle. The upper control arm assembly comprises an upper control arm having a central portion and a pair of end portions. The central portion of the upper control arm is positioned over the rear axle of the vehicle. Each of the pair of end portions of the upper control arm is positioned adjacent the pair of opposing sills of the vehicle and define a bushing aperture. A pair of spool bushings is also provided for retaining the upper control arm. The pair of spool bushings are vertically disposed in the bushing apertures so as to pivotally couple the upper control arm to the pair of opposing sills of the uni-body vehicle. The vertical orientation of the spool bushings maximizes the lateral stiffness of the rear suspension system of the uni-body vehicle, while providing lower fore/aft and vertical stiffnesses. The lower fore/aft stiffness is beneficial in reducing road and powertrain induced harshness. The lower vertical stiffness is beneficial in reducing the amount of vibrational energy transmitted to the vehicle as noise, vibration, and harshness.

8 Claims, 5 Drawing Sheets

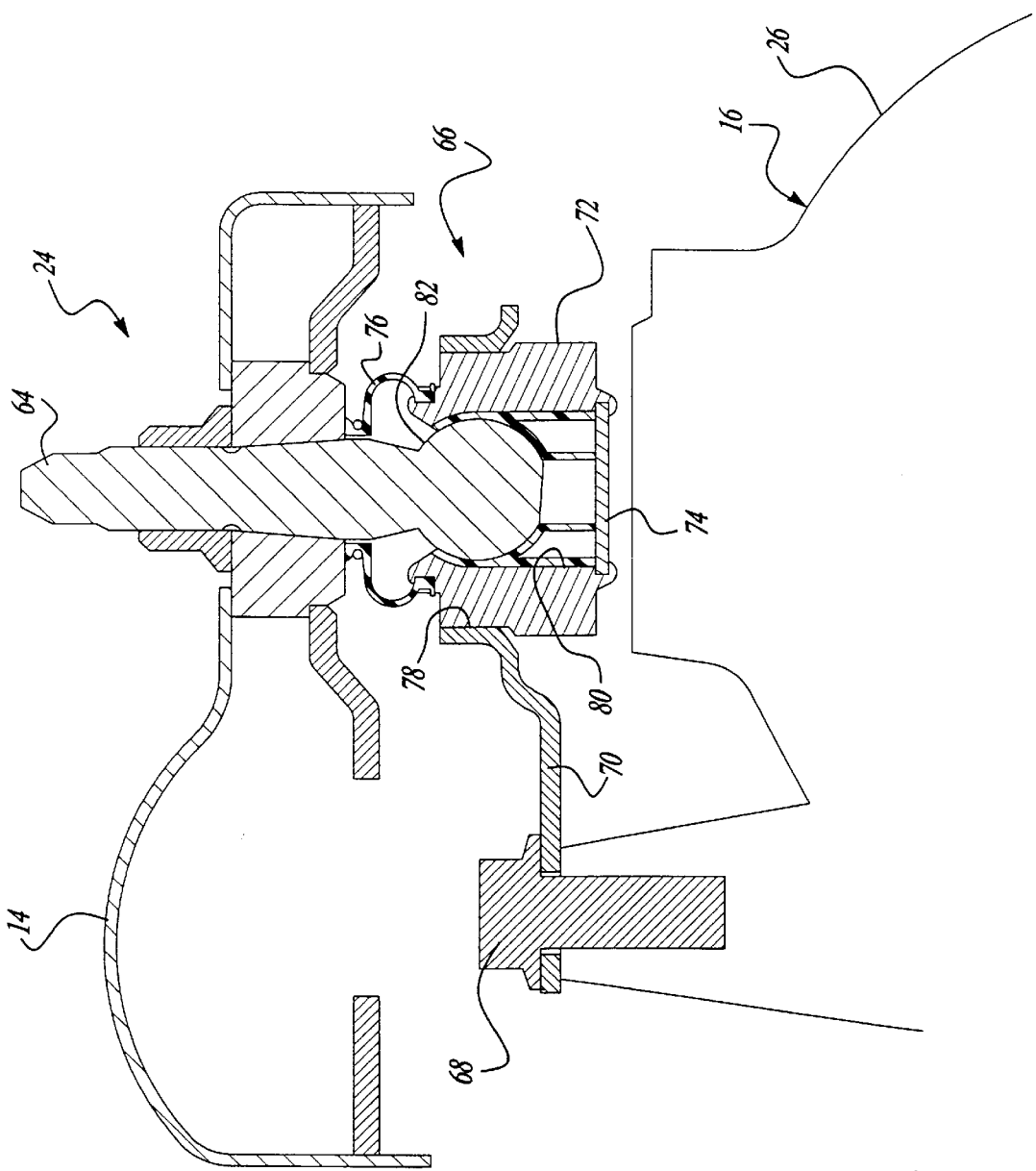

REAR SUSPENSION UPPER CONTROL ARM (A-ARM) WITH VERTICALLY MOUNTED SPOOL BUSHINGS

FIELD OF THE INVENTION

The present invention relates to vehicle suspension systems and, more particularly, to three-link rear suspension systems for uni-body vehicles having vertically mounted spool bushings.

BACKGROUND OF THE INVENTION

As is well known, the rear suspension system of a vehicle typically includes a plurality of control links. In many cases, these control links attach an axle to the frame or chassis of the vehicle to restrain fore, aft, and lateral motion of the axle relative to the vehicle frame. These control links may be arranged in any number of configurations depending upon the specific vehicle support structure used and the operating conditions of the vehicle to stabilize the forces acting on the axle. For example, three-link and five-link systems have been used in vehicles having a frame-type construction, such as trucks and sport-utility vehicles.

The five-link rear suspension system comprises four longitudinal control links and one transversal control link, or trackbar, pivotally connecting the axle to the frame of the vehicle. The four longitudinal control links are typically attached at one end to the axle and at the other end to the frame of the vehicle. These four longitudinal control links stabilize only fore and aft motion of the axle. The single trackbar is typically attached at one end to the carrier or differential assembly and at the other end to the frame of the vehicle. The trackbar, thus, stabilizes only lateral motion of the axle.

The five-link system has the distinct disadvantage of forcing a lateral shift in the axle position as the vehicle suspension travels up and down. This lateral shift is transmitted to the passenger compartment of the vehicle and produces an objectionable "head toss" response of the passengers. This phenomenon is more pronounced when the vehicle is towing a trailer. Such lateral shift in the axle position produces an orbital yaw in both the trailer and the vehicle, thereby producing objectionable trailer response.

Furthermore, the five-link system has the additional disadvantage of requiring the trackbar orientation to be dependent on whether the vehicle is right-hand drive or left-hand drive. That it, if a vehicle is produced for sale in the United States, the front five-link suspension is configured for left-hand drive. Consequently, the trackbar orientation in the rear suspension must be oriented to counteract the forces in the front suspension. If the same vehicle is produced for sale abroad, the front five-link suspension is configured for right-hand drive. Consequently, the trackbar orientation in the rear suspension is oriented opposite that of the left-hand drive configuration. Such change in the rear suspension design increases the cost of producing vehicles for worldwide sale.

In an attempt to overcome the disadvantages of the five-link suspension system, a three-link system has been developed. The three-link system comprises a pair of longitudinal control links pivotally connecting the axle to the frame of the vehicle. The pair of longitudinal control links is typically attached at one end to the axle and at the other end to the frame of the vehicle. These longitudinal control links stabilize only fore and aft motion of the axle. A generally triangularly shaped control link, or A-arm, is also provided for stabilizing the lateral motion and further stabilizing the fore and aft motion of the axle. The A-arm is also pivotally connected to the frame on its ends and pivotally connected to the axle at its central portion.

The three-link system has the advantage of minimizing the lateral shift of the axle, thereby minimizing the "head toss" response of the passengers. Such minimization of the lateral shift further improves the ride comfort and vehicle control when the vehicle is towing a trailer. Moreover, the three-link system utilizes the same design for both left-hand drive and right-hand drive vehicle configurations. Consequently, the manufacturing cost of producing vehicles for multiple worldwide markets can be greatly reduced. The three-link system further reduces the number of vehicle parts and attachment points to reduce the cost of manufacturing.

The three-link rear suspension system has been incorporated into frame-type vehicles with various degrees of success. Some known designs utilize a pair of horizontally disposed bushings. These horizontally disposed bushings are pivotally interconnecting the ends of the A-arm to the frame of the vehicle. Specifically, these horizontally disposed bushings are attached to a vehicle cross-member with clevis attachments. The purpose of the vehicle cross-member is to provide structural support for transferring loads from the vehicle suspension system to the frame and, further, to provide a dimensionally acceptable mounting support for receiving the bushing attachments. However, it should be noted that the structural cross member is assembled to the frame of the vehicle only after the bushing brackets are mounted on the cross member.

A disadvantage of these horizontally disposed bushings is that they may not provide an optimal connection of the suspension system to the vehicle. Specifically, due to the horizontal orientation of the bushings, sufficient lateral stiffness may not be achieved without the use of additional external compressive restraints, such as rubber bumpers. It should be appreciated that such additional compressive restraints increase the cost and difficulty of assembling the suspension system. Moreover, in a preferred suspension design the fore/aft bushing rate and vertical bushing rate are generally identical and comparably larger than the axial or lateral rates. It is believed that this preferred rate relationship provides improved ride and handling characteristics in the vehicle. However, in the horizontally disposed bushing configuration, the actual bushing rate relationship is opposite to the preferred rate relationship, thereby failing to provide an optimal configuration.

In the case of a unit-body construction vehicle, three-link suspension systems are not readily implemented. Unit-body vehicles, or "Uni-body" vehicles, differ from frame-type vehicles in that the uni-body vehicle, unlike frame-type vehicles, has no discernible frame. The structural integrity of the uni-body design is achieved through the body itself using a pair of opposing, longitudinally extending sills. The structural integrity of frame-type design is achieved through a frame member generally extending the length of the vehicle. The frame, in turn, carries the major components of the vehicle, such as the engine, suspension, and body.

Due to the lack of structural cross members in an uni-body vehicle, attachment of the A-arm of the three-link system is more difficult. In fact, the cross-vehicle tolerances for the sill members prohibit the use of horizontally disposed bushings unless a separately attached cross member is used for receiving the bushing attachments. By way of example, these cross-vehicle tolerances for the sill members may be several millimeters. However, this separately attached cross member, when used in an uni-body application, is considered a sub-frame. The addition of a sub-frame increases the cost and assembling difficulty of the vehicle.

Accordingly, there exists a need in the relevant art to provide a three-link rear suspension system capable of maximizing the lateral stiffness of the rear suspension system. Furthermore, there exists a need in the relevant art to provide a three-link rear suspension system capable of being coupled to an uni-body vehicle without the use of a sub-frame, which overcomes the above disadvantages.

SUMMARY OF THE INVENTION

In accordance with the broad teachings of this invention, a rear suspension upper control arm (A-arm) assembly having an advantageous construction is provided.

According to the teachings of the present invention, an upper control arm assembly for a rear axle of an uni-body vehicle is provided. The vehicle includes a pair of longitudinally spaced opposing sills generally extending along the length of the vehicle. The upper control arm assembly comprises a generally triangularly shaped upper control arm having a central portion and a pair of end portions. The central portion of the upper control arm is positioned over the rear axle of the vehicle. Each of the pair of end portions of the upper control arm is positioned adjacent the pair of opposing sills of the vehicle and define a bushing aperture. A pair of spool bushings is also provided for retaining the upper control arm. The pair of spool bushings are vertically disposed in the bushing apertures so as to pivotally couple the upper control arm to the pair of opposing sills of the uni-body vehicle. The vertical orientation of the spool bushings maximizes the lateral stiffness of the rear suspension system of the uni-body vehicle, while providing lower fore/aft and vertical stiffnesses. The lower fore/aft stiffness is beneficial in reducing road and powertrain induced harshness. The lower vertical stiffness is beneficial in reducing the amount of vibrational energy transmitted to the vehicle as noise, vibration, and harshness.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 8 is a cross-sectional view of FIG. 6, taken along line 8—8, illustrating the ball joint assembly.

DETAILED DESCRIPTION OF THE PREFERRED EMBODIMENTS

Figure 1:
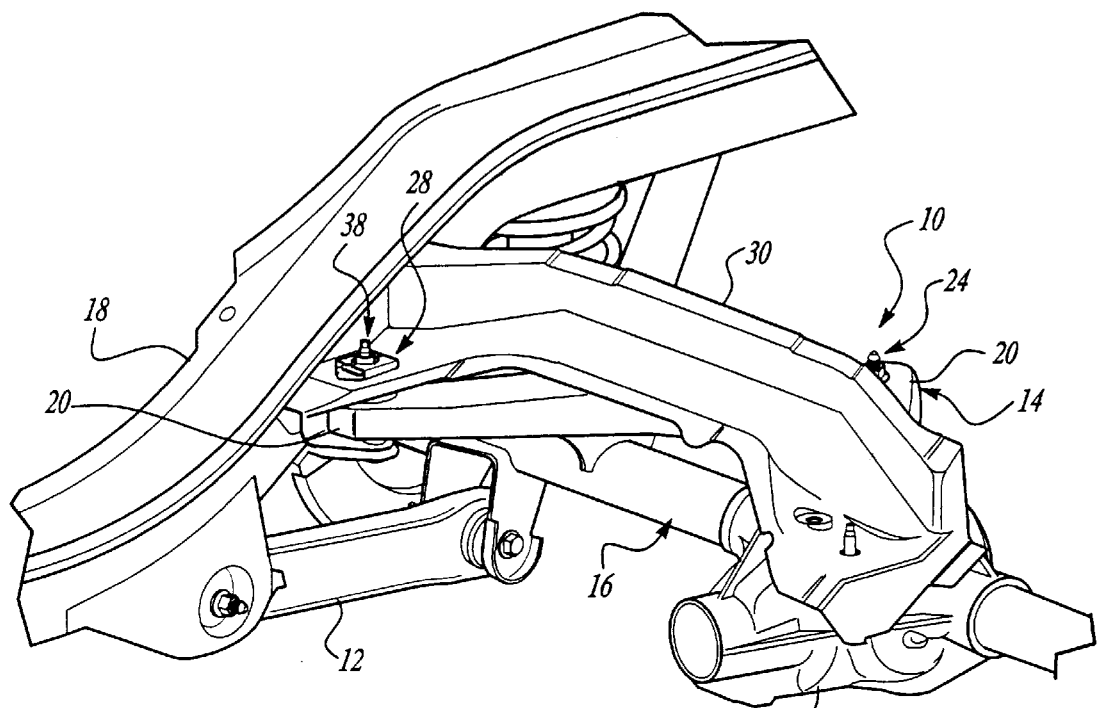
FIG. 1 is a perspective view of a rear suspension system of a uni-body vehicle according to the present invention.

The following description of the preferred embodiment is merely exemplary in nature and is in no way intended to limit the invention, its application, or uses.

Referring to the drawings, a three-link rear suspension system 10 for an uni-body vehicle (not shown) is provided having a pair of lower control arms 12 and an upper control arm or A-arm 14. Each of the pair of lower control arms 12 is pivotally coupled at one end to a rigid axle 16 and pivotally coupled at another end to one of a pair of sills 18 (only one shown) of the uni-body vehicle to stabilize fore and aft motion of axle 16. Each of the pair of sills 18 is opposing spaced from the other and extends generally longitudinally along the uni-body vehicle.

Figure 2:
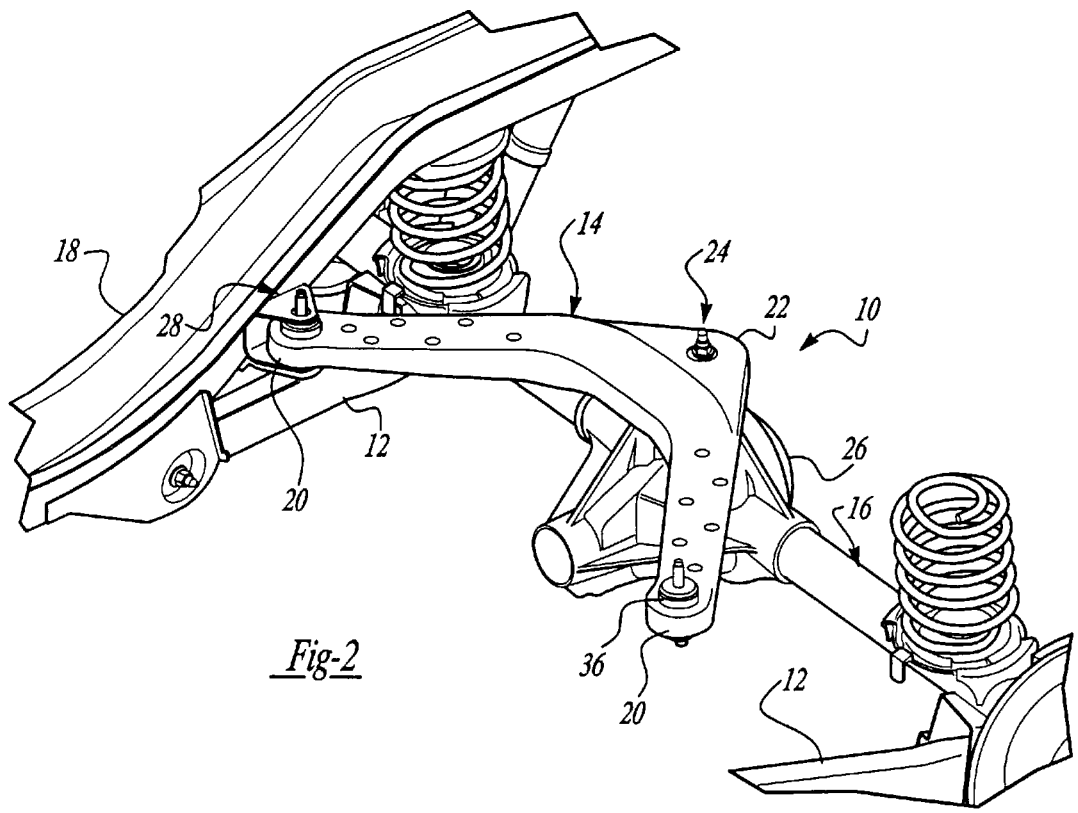
FIG. 2 is a perspective view, similar to FIG. 1, having a cross member of the uni-body vehicle removed for clarity.
Figure 3:
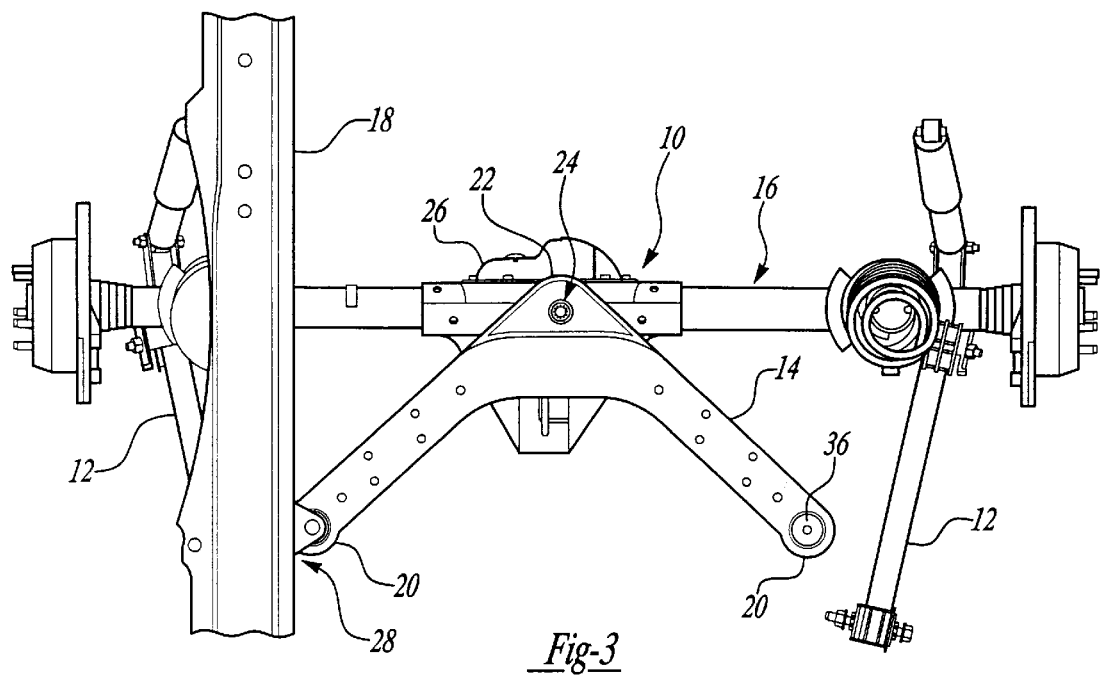
FIG. 3 is a top view, similar to FIG. 2, of the rear suspension system.
Figure 4:
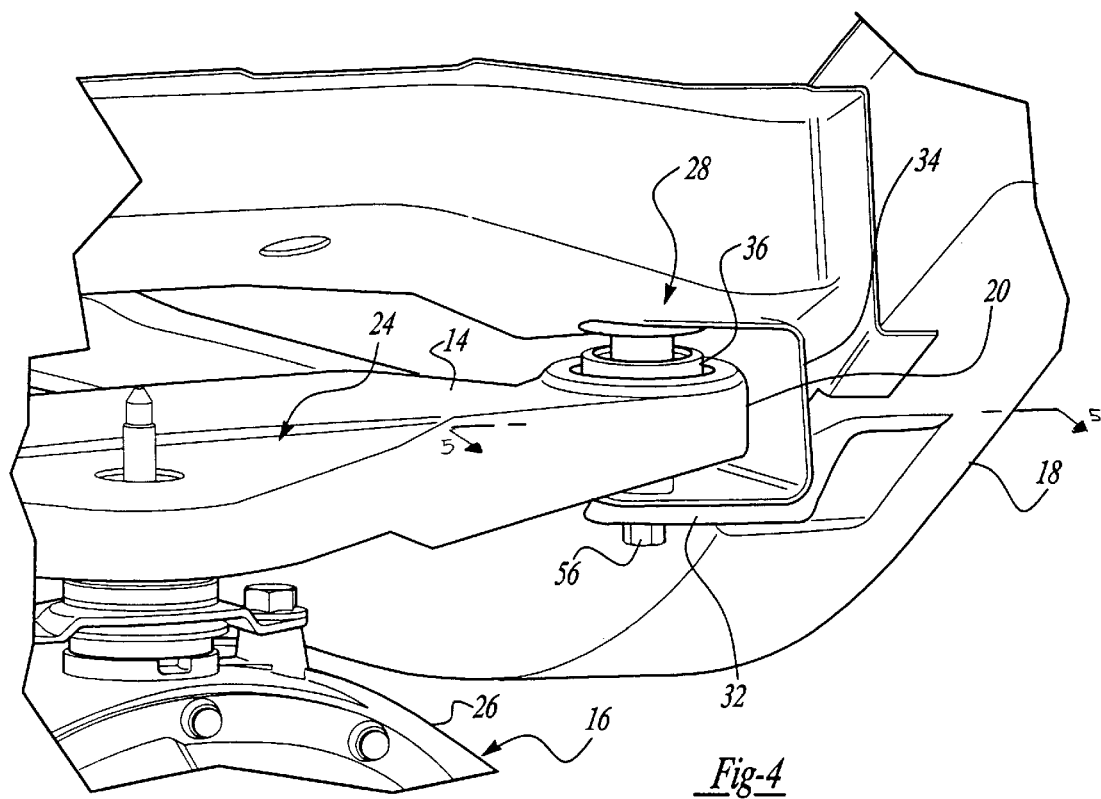
FIG. 4 is a rear perspective view of a vertically oriented spool bushing according to the present invention.

As best seen in FIGS. 2 and 3, A-arm 14 is generally triangularly shaped and defines a pair of end portions 20 and a central portion 22. Preferably, A-arm 14 is stamp-formed and made of steel. A ball-stud assembly 24 is further provided for pivotally coupling central portion 22 of A-arm 14 to a carrier or differential housing 26 of axle 16. Ball-stud assembly 24 will be described in detail below. A pair of spool bushing assemblies 28 are lastly provided for pivotally coupling end portions 20 of A-arm 14 to the pair of sills 18 of the uni-body vehicle to stabilize fore, aft, and lateral motion of axle 16. Preferably, the pair of spool bushing assemblies 28 are coupled to the pair of sills 18 at a position adjacent a transversal uni-body cross member 30 to maximize the structural integrity of the suspension system 10. It should be appreciated that the specific suspension attachment point is determined by the desired anti-squat and roll steer characteristics.

The pair of spool bushing assemblies 28 is identical in both construction and operation. Therefore, in the interest of brevity, only one of the pair of spool bushing assemblies 28 will be described.

Figure 5:
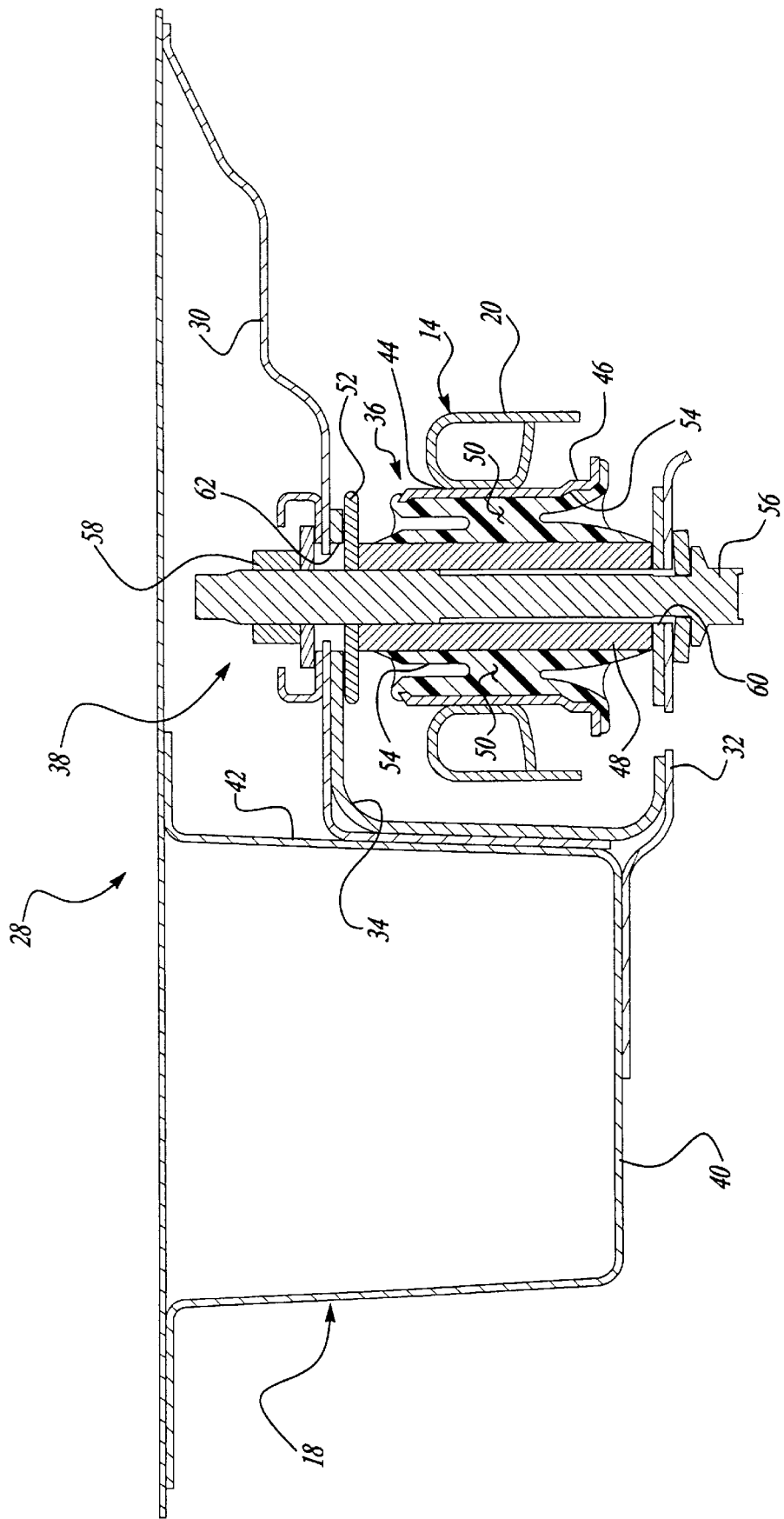
FIG. 5 is a cross-sectional view of FIG. 4, taken along line 5—5, illustrating the vertically oriented spool bushing.

Referring to FIGS. 1–5, spool bushing assembly 28 includes a lower support bracket 32, an upper support bracket 34, a spool bushing 36, and a floating fastener assembly 38. As best seen in FIG. 5, lower support bracket 32 is a generally flat metallic support fixedly secured to a lower portion 40 of sill 18 by suitable means, such as by spot welding. Similarly, upper support bracket 34 is a generally U-shaped metallic support fixedly secured to a side portion 42 of sill 18 and to lower support bracket 32 by suitable means, such as by spot welding. Preferably, upper support bracket 34 and uni-body cross member 30 are secured in an overlapping arrangement with side portion 42 of sill 18 to form a three-layer configuration as shown in FIG. 5. It is believed that this configuration will provide additional structural integrity to the suspension system.

As best seen in FIG. 5, spool-bushing 36 is disposed in a bushing aperture 44 of end portion 20 of A-arm 14. Spool bushing 36 includes an outer housing or can 46, an inner sleeve 48, and an elastomeric member 50 interconnecting can 46 and inner sleeve 48. Outer can 46 is rigidly connected to the bushing aperture 44 of A-arm 14. Elastomeric member 50 minimizes the transmission of noise, vibration, and harshness from axle 16 to the vehicle. Preferably, elastomeric member 50 is made of natural rubber. Inner sleeve 48 includes a metallic washer or ferrule 52 formed integrally therewith on a top end thereof for spreading the contact force of the fastener over a larger area of upper support bracket 34.

Elastomeric member 50 includes a plurality of depressions or voids 54 disposed therein for effectively tuning the directional stiffness of spool bushing 36. That is, the unique voidal geometry of spool bushing 36 enables the fore/aft spring forces and lateral spring force of suspension system 10 to be tailored to the characteristics of a specific vehicle platform. Specifically, the voidal geometry of spool bushing 36 must be configured to withstand very high tilt angles. By way of non-limiting example, the spool bushing of the present invention is configured to withstand tilt angles of approximately ±20°. Such tilt angles are common in modern trucks and sport utility vehicles. It should also be appreciated that the voidal geometry of spool bushing 36 may have any configuration conducive to improving the harshness and handling of the suspension system, including configurations being asymmetrical.

Spool bushing 36 is pivotally coupled to lower support bracket 32 and upper support bracket 34 using floating fastener assembly 38. Floating fastener assembly 38 includes a fastener 56 and a floating case nut 58 fastened thereto. Fastener 56 extends through a pierced hole 60 in lower support bracket 32 and upper support bracket 34. Pierced hole 60 is formed in lower support bracket 32 and upper support bracket 34 simultaneously with a corresponding pierced hole in the lower support bracket and the upper support bracket secured to the opposing sill of the uni-body vehicle. By simultaneously forming the left and right pierced holes in the lower and upper support brackets, the cross-vehicle tolerance of the pierced holes is closely maintained in contrast to the cross-vehicle tolerance of the sills members. Fastener 56 further extends through an aperture 62 formed in the top portion of upper support bracket 34 and cross member 30 of the uni-body vehicle. Aperture 62 is preferably oversized and preformed in upper support bracket 34 and cross member 30 for convenient assembly of spool bushing 36. However, it should be appreciated that aperture 62 may be pierced after the uni-body is assembled, as described in reference to pierced hole 60.

Figure 6:
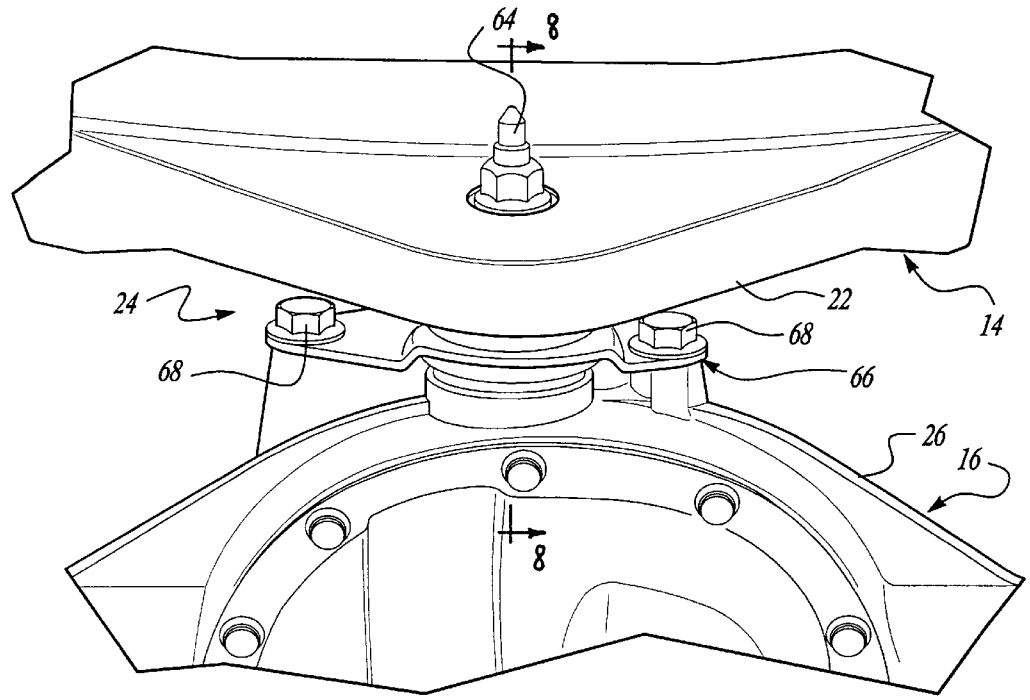
FIG. 6 is a rear perspective view of a ball joint assembly of the rear suspension system.
Figure 7:
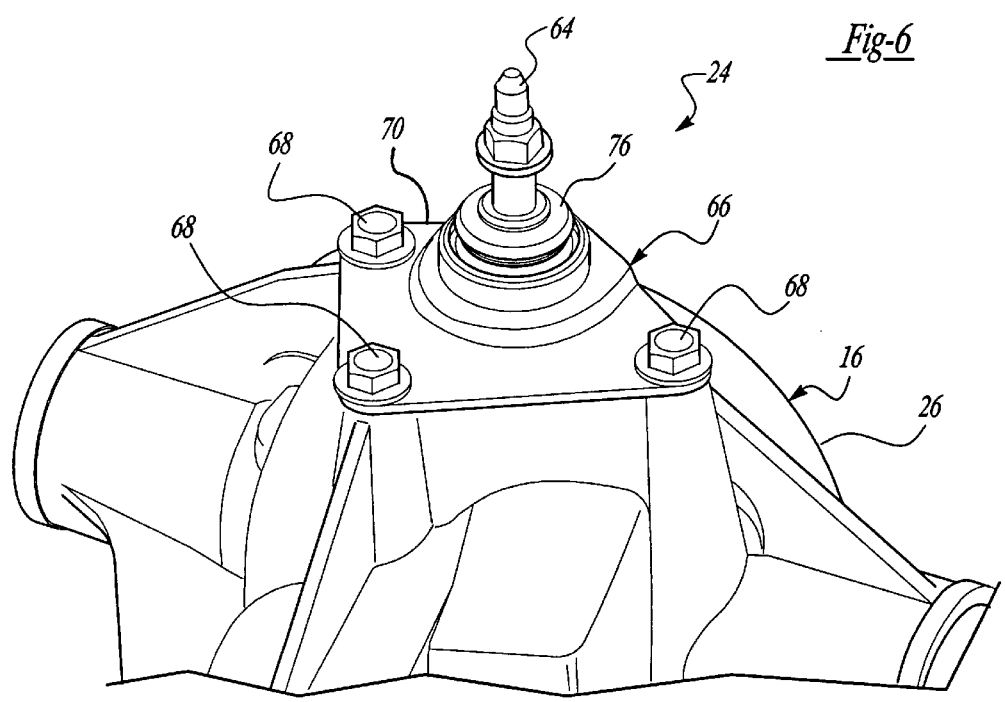
FIG. 7 is a perspective view of the ball joint assembly, similar to FIG. 6, having the A-arm removed.

Referring to FIGS. 6–8, ball-stud assembly 24 includes a ball stud 64 secured to central portion 22 of A-arm 14 and a mounting plate assembly 66 secured to carrier housing 26 of axle 16 using a plurality of fasteners 68. Mounting plate assembly 66 includes a mounting plate 70, an inner housing 72, a bearing race 74, and a sealing member 76. Mounting plate 70 is a generally flat metallic member having a central opening 78 for receiving inner housing 72 therethrough. Inner housing 72 is preferably metallic and includes a central bore 80 for receiving a ball portion 82 of ball stud 64 and bearing race 74 therein. Sealing member 76 is lastly provided for sealing ball portion 82 and bearing race 74 from environmental effects. Ball-stud assembly 24 is adapted to pivotally couple A-arm 14 to axle 16 to accommodate suspension travel and roll angle of the vehicle.

It should be appreciated that, unlike previous attempts, the present invention enables an upper control arm, or A-arm, of a three-link rear suspension system to be coupled to a vehicle having uni-body construction. The technique of simultaneously piercing left and right holes in the support brackets has the distinct advantage of overcoming the typically high cross-vehicle tolerances of uni-body vehicle. The simultaneous piercing enables the mounting holes of the A-arm to be more accurately positioned for simplified assembly and improved results. Furthermore, the vertically oriented spool bushings of the present invention enable the spring force rates of the elastomeric member to be tuned or adjusted in accordance with the specific vehicle platform.

It should be further appreciated that the present invention overcomes the disadvantages associated with five-link rear suspensions in that the three-link rear suspension of the present invention does not exhibit the objectionable "head toss"associated with the five-link suspension design. Moreover, the present invention may be used on vehicles manufactured for sale worldwide, without the need to flip the orientation of the system as described above with regard to the five-link system. Still further, the present invention reduces the number of suspension components and the number of attachment points again relative to the five-link system.

The invention being thus described, it will be obvious that the same may be varied in many ways. Such variations are not to be regarded as a departure from the spirit and scope of the invention. Such variations or modifications, as would be obvious to one skilled in the art, are intended to be included within the scope of the following claims.

What is claimed is:

1. An upper control arm assembly for a rear axle of a uni-body vehicle, said vehicle having a pair of longitudinally spaced opposing sills, said upper control arm assembly comprising:

a generally triangularly shaped member having a central portion positionable over the axle of the vehicle and a pair of end portions each positionable adjacent the pair of opposing sills, each of said end portions of said generally triangularly shaped member defining an aperture; and a pair of spool bushings being vertically disposed in said apertures for retaining said generally triangularly shaped member, said pair of spool bushings being mountable to the pair of opposing sills of the uni-body vehicle.

2. The assembly according to claim 1, further comprising:

a pair of opposing upper support brackets being capable of being secured to the sills of the uni-body vehicle; said pair of upper support brackets being respectively coupled to said pair of spool bushings; and a pair of opposing lower support brackets being capable of being secured to the uni-body vehicle, said pair of lower support brackets being respectively coupled to said pair of spool bushings, wherein said upper and lower support brackets cooperate to support said pair of spool bushings.

3. The assembly according to claim 2, further comprising:

a ball stud extending from said central portion of said generally triangularly shaped member; and a mounting plate assembly being mountable to the axle of the uni-body vehicle for receiving said ball stud, whereby said ball stud and said mounting plate assembly are adapted to cooperate to enable the axle to articulate relative to said generally triangularly shaped member.

4. The assembly according to claim 2 wherein each of said pair of spool bushings includes:

an outer housing disposed in said aperture of said generally triangularly shaped member;

an inner sleeve being secured to one of said upper support brackets and one of said lower support brackets; and an elastomeric member interconnecting said outer housing and said inner sleeve for minimizing the transmission of noise, vibration, and harshness through said pair of spool bushings, said elastomeric member having a predetermined voidal geometry for tuning the directional stiffness of said pair of spool bushings.

5. A suspension system for a rear axle of a vehicle, said vehicle having an uni-body construction, said suspension system comprising:

a pair of lower control arms for minimizing fore and aft axle motion, each of said pair of lower control arms longitudinally positionable along the vehicle and being pivotally mountable to the uni-body and pivotally mountable to the axle of the vehicle;

an upper control arm being generally triangularly shaped for minimizing lateral axle motion;

a pair of generally vertically oriented spool bushings adapt for coupling said upper control arm to the uni-body of the vehicle; and a coupling device pivotally mountable between said upper control arm and the axle of the vehicle.

6. The suspension system according to claim 5, further comprising:

a pair of opposing upper support brackets being mountable to the uni-body; said pair of upper support brackets being respectively coupled to said pair of generally vertically oriented spool bushings; and a pair of opposing lower support brackets being mountable to the uni-body, said pair of lower support brackets being respectively coupled to said pair of generally vertically oriented spool bushings, wherein said brackets cooperate to support said pair of generally vertically oriented spool bushings.

7. The suspension system according to claim 6 wherein said coupling device includes:

a ball stud being mounted to said upper control arm; and a mounting receptacle being mountable to the axle said mounting receptacle receiving said ball stud to form a ball joint, whereby said coupling device is adapted to enable the axle to articulate relative to said upper control arm.

8. The suspension system according to claim 6, wherein each of said pair of generally vertically oriented spool bushings includes:

an outer housing being coupled to said upper control arm;

an inner sleeve being coupled to one of said pair of upper support brackets and one of said pair of lower support brackets; and an elastomeric member interconnecting said outer housing and said inner sleeve for minimizing the transmission of noise, vibration, and harshness through said pair of generally vertically oriented spool bushings, said elastomeric member having a predetermined voidal geometry for tuning the directional stiffness of said pair of generally vertically oriented spool bushings.

* * * * *